(12) United States Patent
Greenwald et al.

(10) Patent No.: US 10,346,823 B2
(45) Date of Patent: Jul. 9, 2019

(54) METHODS AND SYSTEMS FOR ACTIVATING AN ELECTRONIC PAYMENTS INFRASTRUCTURE

(75) Inventors: Gary Greenwald, Bedford Hills, NY (US); Dickson Chu, New York, NY (US)

(73) Assignee: CITIBANK, N.A., New York, NY (US)

( * ) Notice: Subject to any disclaimer, the term of this patent is extended or adjusted under 35 U.S.C. 154(b) by 711 days.

(21) Appl. No.: 13/208,927

(22) Filed: Aug. 12, 2011

(65) Prior Publication Data
US 2013/0041817 A1    Feb. 14, 2013

(51) Int. Cl.
G06Q 20/32    (2012.01)
G06Q 20/20    (2012.01)
G06Q 20/36    (2012.01)

(52) U.S. Cl.
CPC ............ *G06Q 20/32* (2013.01); *G06Q 20/20* (2013.01); *G06Q 20/36* (2013.01); *G06Q 20/3672* (2013.01)

(58) Field of Classification Search
CPC ..................................................... G06Q 20/32
USPC ......... 235/375, 379, 380; 705/35, 39, 43, 41
See application file for complete search history.

(56) References Cited

U.S. PATENT DOCUMENTS

| 5,025,373 | A | * | 6/1991 | Keyser et al. ................. 705/42 |
| 5,453,601 | A | | 9/1995 | Rosen |
| 5,455,407 | A | | 10/1995 | Rosen |
| 5,557,518 | A | | 9/1996 | Rosen |
| 5,621,797 | A | | 4/1997 | Rosen |
| 5,659,165 | A | | 8/1997 | Jennings et al. |
| 5,671,280 | A | | 9/1997 | Rosen |
| 5,745,886 | A | | 4/1998 | Rosen |
| 5,799,087 | A | | 8/1998 | Rosen |
| 5,825,003 | A | | 10/1998 | Jennings et al. |

(Continued)

OTHER PUBLICATIONS

International Search Report and Written Opinion dated Nov. 5, 2012 in counterpart International Patent Application No. PCT/US2012/050263, pp. 1-22.

(Continued)

*Primary Examiner* — Kirsten S Apple
*Assistant Examiner* — Martin A Gottschalk
(74) *Attorney, Agent, or Firm* — Johnson, Marcou & Isaacs, LLC; John M. Harrington, Esq.

(57) ABSTRACT

Methods and systems for activating an electronic payments infrastructure employ, for example, a token consisting at least in part of a unique identifier assigned to an inactive header account which is provided on a customer's electronic device. The unique identifier is processable via a transaction processing network. A request, which includes customer information, is received to verify that activation of the header account for the customer is compliant with predefined customer identification rules. A determination is made that activation of the header account for the customer is compliant with the predefined customer identification rules. An activation message is sent to the customer's device using the interface processor, the header account is linked to a digital wallet on a database, and the customer's designation of a source account for the digital wallet is received on the database. The header account can be used in transactions with either on-us or off-us source accounts.

18 Claims, 6 Drawing Sheets

(56) References Cited

U.S. PATENT DOCUMENTS

| | | | |
|---|---|---|---|
| 5,920,629 A | 7/1999 | Rosen | |
| 5,953,710 A * | 9/1999 | Fleming | 705/38 |
| 5,963,647 A | 10/1999 | Downing et al. | |
| 5,963,648 A | 10/1999 | Rosen | |
| 6,032,135 A * | 2/2000 | Molano et al. | 705/41 |
| 6,047,067 A | 4/2000 | Rosen | |
| 6,081,790 A | 6/2000 | Rosen | |
| 6,098,053 A | 8/2000 | Slater | |
| 6,122,625 A | 9/2000 | Rosen | |
| 6,205,436 B1 | 3/2001 | Rosen | |
| 6,978,250 B1 | 12/2005 | Kawan et al. | |
| 7,051,001 B1 | 5/2006 | Slater | |
| 7,258,274 B2 | 8/2007 | Levinas et al. | |
| 7,343,351 B1 * | 3/2008 | Bishop et al. | 705/67 |
| 7,398,253 B1 | 7/2008 | Pinnell | |
| 7,606,770 B2 | 10/2009 | Pinnell | |
| 7,735,125 B1 * | 6/2010 | Alvarez et al. | 726/9 |
| 2003/0011578 A1 * | 1/2003 | Bergovist et al. | 345/179 |
| 2007/0130042 A1 * | 6/2007 | Dryden | 705/36 R |
| 2008/0140564 A1 | 6/2008 | Tal et al. | |
| 2008/0249913 A1 | 10/2008 | Chan et al. | |
| 2009/0068982 A1 | 3/2009 | Chen et al. | |
| 2009/0192935 A1 | 7/2009 | Griffin et al. | |
| 2010/0123002 A1 * | 5/2010 | Caporicci | 235/380 |
| 2010/0123003 A1 * | 5/2010 | Olson et al. | 235/380 |
| 2010/0250390 A1 | 9/2010 | Song et al. | |
| 2012/0028609 A1 * | 2/2012 | Hruska | 455/411 |

OTHER PUBLICATIONS

Baharlou, International Preliminary Report on Patentability for PCT/US2012/050263 dated Apr. 1, 2014, 12 pages.

* cited by examiner

METHODS AND SYSTEMS FOR ACTIVATING AN ELECTRONIC PAYMENTS INFRASTRUCTURE

FIELD OF THE INVENTION

The present invention relates generally to the field of electronic commerce, and more particularly to methods and systems for activating an electronic payments infrastructure using an electronic communication device, such as a mobile phone.

BACKGROUND OF THE INVENTION

Currently, a telephone company/carrier-billed mobile customer can purchase a connected mobile device from a telephone/carrier wireless network operator, such as AT&T®, VERIZON®, or T-MOBILE®, with payment functionality, but that payment functionality is very limited. For example, a customer is typically able to make only low-value payments in a range of $30 or less per month. Further, the selection is generally limited, for example, to the purchase of digital goods, such as ring tones, music, apps, and video, which is funded through the monthly telephone/carrier monthly statement. There is a present need to extend the current telephone company billing model and to enable full customer payment capability.

SUMMARY OF THE INVENTION

Embodiments of the invention employ computer hardware and software, including, without limitation, one or more processors coupled to memory and non-transitory computer-readable storage media with one or more executable programs stored thereon which instruct the processors to perform the methods for activating an electronic payments infrastructure described herein. In an embodiment of the invention, a token consisting at least in part of a unique identifier assigned to an inactive header account is provided on a customer's electronic device. The unique identifier may be processable via a transaction processing network.

Using an interface processor, a request is received to verify that activation of the header account for the customer is compliant with regulations applicable to onboarding customers and/or initiating customer relationships and monitoring financial transactions of customers, including, without limitation customer identification programs and Anti-Money-Laundering regulations defined by various regulatory authorities (referred to collectively herein as "predefined customer identification rules"). The request consists at least in part of customer information. A determination is made, using a customer identification processor, that activation of the header account for the customer is compliant with the pre-defined customer identification rules. Again using the interface processor, an activation message is sent to the customer's device, the header account is linked to a digital wallet on a database, and the customer's designation of a source account for the digital wallet is received in the database.

In embodiments of the invention, the customer's electronic device may be a mobile telephone. In other embodiments, the customer's electronic device may be an integrated circuit chip card. In still other embodiments, the electronic device may be a TV set-top box or a browser application. In one aspect, the token may comprise a software and/or hardware token. In another aspect, the token may comprise a microchip embedded with the unique identifier. In a further aspect, the unique header account identifier may comprise computer code laid into a chipset provided on the customer's electronic device. In an additional aspect, the unique header account identifier may comprise a primary account number by which merchants can process payments. In still another aspect, the primary account number may comprise a bank identification number.

The unique identifier for embodiments of the invention may be processable via the transaction processing network with a financial institution playing an issuer role in the processing network. In one aspect, the unique identifier is assigned to the header account on the database. In another aspect, the unique identifier is processable via a card association transaction processing network.

According to embodiments of the invention, the request to verify may be received by a customer identification processor. Additionally, the activation message may be sent to the customer's device by the customer identification processor. Further, sending the activation message to the customer's device may comprise activating the unique identifier on a microchip installed on the customer's device. Receiving the customer's designation of a source account may comprise receiving an activation response message from the customer's device consisting at least in part of the unique header account identifier and the customer's designation of the source account. In addition, the customer's designation of the source account may comprise receiving the customer's designation of a credit card account as the source account.

In an aspect in which the header account is used for an "on-us" transaction (i.e., the header account and the source account are issued by the same entity), an authorization request with the header account identifier may be received, via a transaction processing network, from a merchant acquirer processor by a header account processor. In such aspect, using the header account processor, an on-us source account designated by the customer to fund the digital wallet to which the header account is linked on the database may be identified and debited. In addition, an authorization message may be sent, via the transaction processing network, to the merchant acquirer processor by the header account processor.

In an aspect in which the header account is used for an "off-us" transaction (i.e., the source account is issued by a different entity than the header account), an authorization request with the header account identifier may be received by a header account processor via a transaction processing network with which the issuer of the header account has an association. In such aspect, using the header account processor, an off-us source account designated by the customer to fund the digital wallet to which the off-us source account is linked on the database may be identified. Further, an authorization request with the off-us source account identifier may be sent by the header account processor to an account processor of the off-us account issuer via a transaction processing network with which the issuer of the off-us source account has an association.

In the off-us transaction aspect, an authorization message may be received from the account processor of the off-us account issuer by the header account processor via the transaction processing network with which the issuer of the off-us source account has an association. In this aspect, an authorization message may be sent to the merchant acquirer processor by the header account processor via the transaction processing network with which the issuer of the header account has an association.

Another aspect of embodiments of the invention involves, for example, a method of activating an inactive header account and linking a digital wallet on a database to the header account, such header account being linked to a customer electronic device having a hardware or software token consisting at least in part of a unique identifier. In such aspect, a request is received via an interface processor to activate an inactive header account and link it to a digital wallet on a database. The request may consist at least in part of customer information. A determination may be made, using a customer identification processor, whether or not the header account for the customer is compliant with pre-defined customer identification rules. If the customer is compliant with predefined customer identification rules, the inactive header account may be activated and linked, using the interface processor, to the digital wallet and a message may be sent to the electronic device, using the interface processor, that the header account has been activated and linked to the digital wallet in accordance with the request. If the customer is not compliant with the predefined customer identification rules, a message may be sent, using the interface processor, to the electronic device that the request has been denied.

A further aspect of embodiments of the invention involves, for example, a method of designating a source account for a digital wallet on a database linked to a header account for a customer electronic device having a hardware or software token consisting at least in part of a unique identifier. In such aspect, a request is received via an interface processor to designate a source account for the digital wallet on a database linked to a header account. The request may consist at least in part of customer information and source account information. A determination may be made, using a customer identification processor, whether or not the header account for the customer is compliant with predefined customer identification rules. If the customer is compliant with predefined customer identification rules, the source account may be linked, using the interface processor, to the digital wallet and a message may be sent to the electronic device, using the interface processor, that the source account has been designated in accordance with the request. If the customer is not compliant with the predefined customer identification rules, a message may be sent, using the interface processor, to the electronic device that the request to designate the source account has been denied.

An additional aspect of embodiments of the invention involves, for example, a method of verifying that activating a header account linked to a digital wallet on a database, and linked to a customer electronic device having a hardware or software token consisting at least in part of a unique identifier, is compliant with customer identification rules. In such aspect, a request is received, using an interface processor, to verify that the header account for the customer is compliant with predefined customer identification rules. The request may consist at least in part of customer information. A determination may be made, using a customer identification processor, that the header account for the customer is compliant with the predefined customer identification rules.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

A digital ecosystem may be defined as any distributed adaptive open socio-technical system with properties of self-organization, scalability and sustainability, inspired by natural ecosystems. Embodiments of the invention provide a digital money infrastructure service method and system which, for example, institutional clients of a financial institution in digital network ecosystems can use to enable their end customers to make bank-grade payments on their network-connected devices. Global bank payment services may be provided to such institutions, enabling their customers to make payments anywhere in the world in a manner that is as simple, secure, and easy as making a telephone call.

Embodiments of the invention integrate four modular payment services delivered globally. The four modular payment services include, for example, consumer on-boarding or customer identification verification and adjudication; a stored value header account system utilizing a chip embedded number, such as a secure primary account number (PAN) having 14 or 16 digits; a digital open wallet with embedded value exchange capability to fund the header account; and payment transaction monitoring for anti-money laundering and fraud. An example of a PAN number is an account number, such as a MASTERCARD® or VISA® account number using a financial institution-issued bank identification number (BIN) that identifies the issuing bank. However, it is to be understood that any suitable unique identifier that is processable, for example, via a network, such as a card association processing network, can be used as the header account identifier.

By combining these modular services into an integrated offering, embodiments of the invention deliver a global solution that operates across most markets and connected device ecosystems. Embodiments of the invention provide a platform service that lives in the cloud and is device independent. Any form factor, such as a mobile phone, a set-top box, an Internet browser, a tablet, or a physical card, is supported by embodiments of the invention. Payment implementation can be tailored to work seamlessly at the "last mile" of a digital network ecosystem in which a consumer may interact directly with a connected device. Embodiments of the invention enable these connected device ecosystems to provide end customers with a simple and regulatory-compliant way to make payments.

Embodiments of the invention are tailored for major digital network ecosystems, such as retailer-sold, pre-paid mobile devices, telephone company/carrier-billed mobile devices, and cable/satellite system set-top box devices. Currently, a telephone company/carrier-billed mobile customer can purchase a connected mobile device from a telephone/carrier wireless network operator, such as AT&T®, VERIZON®, or T-MOBILE®, with limited payment functionality. As previously noted, the customer is able to make only low-value payments in a range of $30 or less per month to purchase digital goods, such as ring tones, music, apps, and video, the purchase of which is funded through the monthly telephone/carrier monthly statement.

Embodiments of the invention extend the current telephone company billing model and transform it to enable full customer payment capability. The four payment services modules for embodiments of the invention are integrated into the connected device ecosystems to enable the customer to pay for all goods across all distribution channels, such as stores, electronic and mobile commerce, and peer-to-peer commerce, using multiple electronic communication protocols, such as near-field communication, text, or bar code.

In embodiments of the invention, a secure unique identifier for an inactive header account is provided for a customer's electronic device, such as a customer's electronic telecommunication device. The unique identifier may, for example, be embedded in a microchip on the customer's electronic telecommunication device. Further, the unique identifier may be processable via a transaction processing network with the issuing financial institution playing a merchant role in the processing network.

Figure 1:
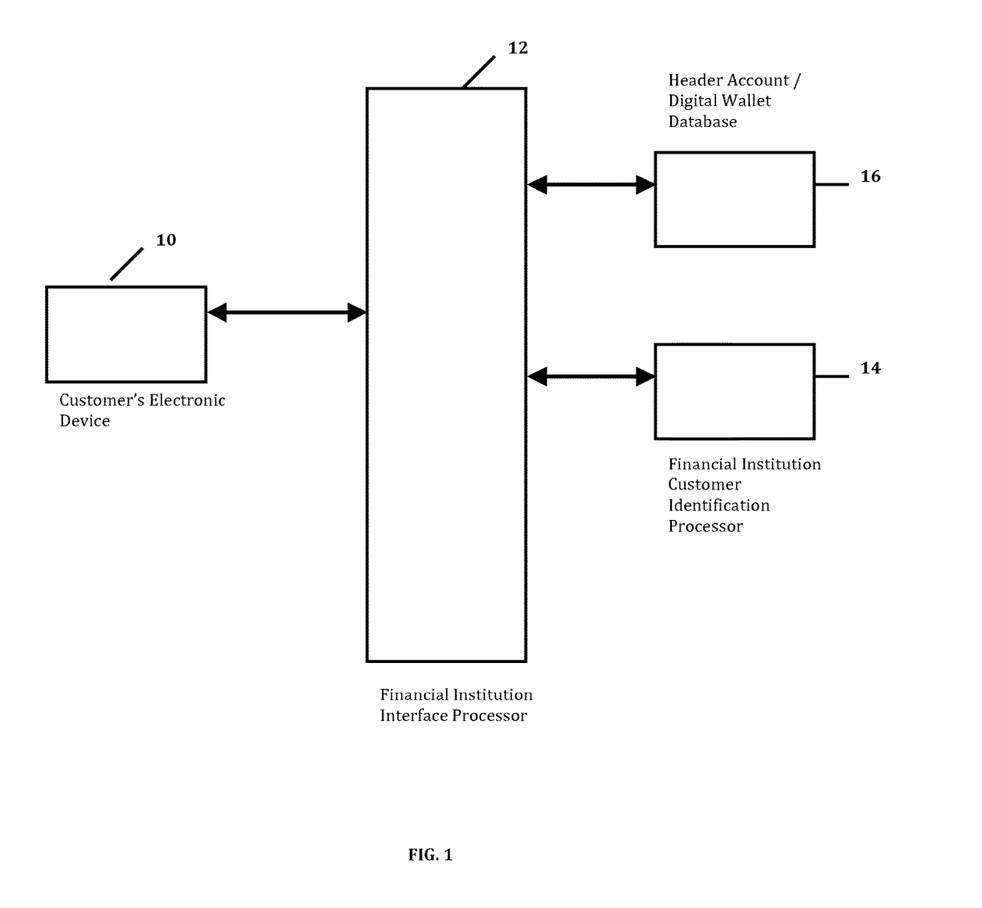
FIG. 1 is a schematic diagram that illustrates an example of key components and the flow of information between the key components in the process of providing the secure unique identifier for an inactive header account for the customer's electronic device according to embodiments of the invention.
Figure 2:
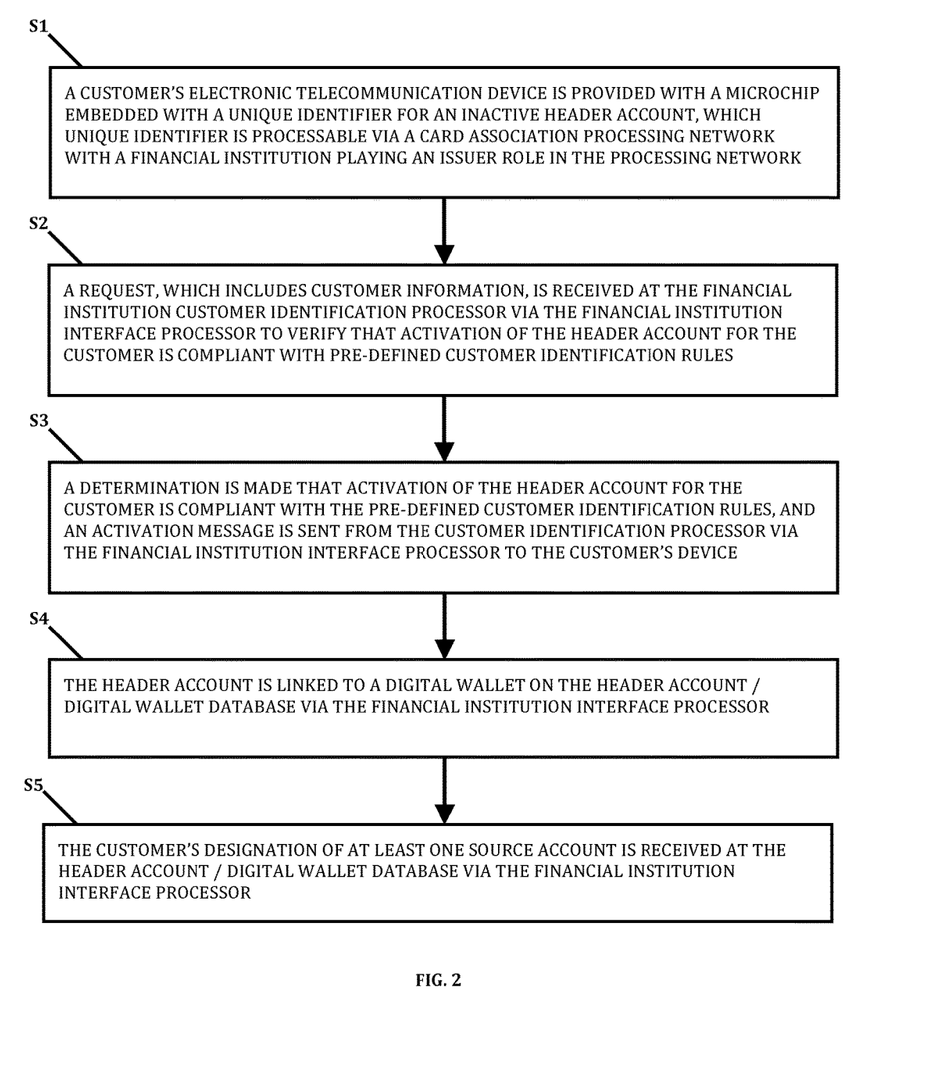
FIG. 2 is a flow chart that illustrates an example of the process of activating the secure unique identifier for the header account for the customer's electronic device in embodiments of the invention.

FIG. 1 is a schematic diagram, which illustrates an example of the components employed in the process of providing the secure unique identifier for an inactive header account for the customer's electronic device according to embodiments of the invention. Referring to FIG. 1, the components include, for example, the customer's electronic device 10 in communication via a financial institution interface processor 12 with a customer identification verification processor 14 and a database 16 storing header account data and digital wallet data. FIG. 2 is a flow chart, which illustrates an example of the process of activating the secure unique identifier for the header account for the customer's electronic device in embodiments of the invention.

Referring to FIGS. 1 and 2, at S1, a customer's electronic telecommunication device 10 is provided with a microchip embedded with a unique identifier for an inactive header account, which unique identifier is processable via a card association processing network with a financial institution playing a merchant role in the processing network. At S2, a request, which includes customer information, is received at the financial institution customer identification processor 14 via the financial institution interface processor 12 to verify that activation of the header account for the customer is compliant with pre-defined customer identification rules.

Referring further to FIGS. 1 and 2, at S3, a determination is made that activation of the header account for the customer is compliant with the pre-defined customer identification rules, and an activation message is sent from the customer identification processor 14 via the financial institution interface processor 12 to the customer's device 10. At S4, the header account is linked to a digital wallet on the header account/digital wallet database 16 via the financial institution interface processor 12. At S5, the customer's designation of at least one source account is received at the header account/digital wallet database 16 via the financial institution interface processor 12.

According to embodiments of the invention, the customer's electronic device may comprise a pre-paid mobile connected device, such as a pre-paid mobile device marketed by SAMSUNG®, HTC®, NOKIA®, and others. Alternatively, the customer may purchase the mobile connected device and separate prepaid minutes on a subscriber identity module (SIM) card. In either case, embodiments of the invention provide a quick and simple way to enable customers to make bank-grade payments on their connected devices.

According to other embodiments, the customer's electronic device may comprise a cable/satellite system. The process with the cable/satellite system may be similar to the process with the telephone company/carrier monthly billed ecosystem. Since the cable/satellite television system is not typically a personal device environment with an authenticated user, an additional set of services may be provided to authenticate an individual user, for example, of a set-top box remote control and enable payments and electronic commerce using digital television.

Embodiments of the invention allow a customer's electronic communication device, such as a mobile phone, to become a payment device utilizing a token, such as a PAN number, as the unique header account identifier. As previously noted, PAN numbers are the standard 14 or 16-digit mechanisms by which merchants can process payments. Embedded in those numbers is sufficient information to determine with which particular card association, such as VISA®, MASTERCARD®, AMERICAN EXPRESS®, or DISCOVER®, an account is associated, whether it is a debit or credit card account, the identity of the issuing bank, and a number of other similarly important factors. Use of a 14 or 16-digit PAN number with the financial institution's BIN number as a secure unique identifier for the header account enables the identifier to be processed through a card association network.

However, it is to be understood that embodiments of the invention are not limited to use of a PAN number as the header account identifier. For example, a customer's device may be provided with a suitable secure element or token which only the financial institution has a key to unlock. The financial institution may associate such token with a unique identifier for the header account. The token may consist, for example, of an existing PAN that uses a personal identification number (PIN) to leverage existing card processing networks. The unique header account identifier may be a PAN issued by the financial institution that does not utilize an existing financial institution BIN number. The financial institution may create a PAN, for example, in cooperation with one or more card association processing networks.

The unique header account identifier for embodiments of the invention may comprise computer code laid into a subset of a smart element provided on a customer's electronic device. The inactive header account identifier may be provided in a secure element of an appropriate chipset for the customer's electronic communication device. For example, the financial institution may provide one or more manufacturers of smart elements for mobile phones a seed number and an algorithm with which to generate a range of latent unique code in their production. This may enable, for example, a manufacturing process in which ranges of unique keys may be designated to multiple manufacturers in a paradigm in which several manufacturers may work in parallel. Thus, the financial institution may furnish a first manufacturer one seed number as a beginning point for generating a range of unique keys and furnish a second manufacturer another seed number as a beginning point for generating a different range of unique keys.

Embodiments of the invention employ an arbitrary, unique number, such as a PAN number, as an identifier for each inactive header account to ensure that each device has a unique identifier, even though such devices may be made by different manufacturers. Each chip manufacturer may embed its chipsets with PAN numbers that are synchronized with the financial institution's unique provisioning scheme. Thus, a mechanism may be provided that ensures that each device has a unique identifier whether the devices are made by one manufacturer or by several different manufacturers.

In embodiments of the invention, the unique identifier, such as the 14 or 16-digit PAN number, is assigned to each inactive header account by the financial institution. A mirror of that unique identifier is likewise assigned by the financial institution to a particular chipset. The assigned identifier may be introduced into a device at the time a device is manufactured or at a later time when a chipset is installed into a device. Thus, the chip manufacturer may install the unique identifier in the chips at the time the chips are made, in which case the chips with the unique identifier already installed may be assembled into the device later. Alternatively, the device manufacturer may install the unique identifier into chips at the time the chips are assembled into the devices by the device manufacturer. Either way, before a device, such as a mobile phone, is packaged for shipment, it has the unique identifier installed. The financial institution also has a mirror identifier, such as a PAN number, assigned to an inactive header account, for example, in its digital wallet platform.

It is to be understood that while the unique header account identifier may be a number, such as a PAN number with a BIN number that identifies the financial institution, that is processable through a card association network, it may not be the account number that is exposed to a merchant when a customer uses the customer's device in a transaction with the merchant. Instead, the identifier for a funding source, such as the customer's credit card account, that is linked to the header account may be used for that purpose. The customer's source account identifier, such as a credit card account number, may be the account number that is actually exposed to a merchant and processed through the card association network for payment. However, the customer's unique header account identifier with a financial institution BIN may be used by the financial institution to identify the customer's source account that is linked to the customer's header account. Upon identifying the linked source account, the financial institution may furnish an authorization for the customer's transaction with the merchant using the linked source account as the mode of payment. The funding source may be an account, such as a credit card account, that is issued by the financial institution. However, it is to be understood that the source account may be an account issued by an entity other than the financial institution.

In embodiments of the invention, the financial institution may have a typical role as issuer in a transaction with the customer's header account by virtue of the financial institution's payment to the merchant on behalf of the customer for a transaction via the header account. However, the financial institution may also have the role of merchant of record acting essentially as its own merchant acquirer in such a transaction by virtue of being paid for the transaction via the customer's linked source account.

As noted, the unique header account identifier may be a valid payment account number that can be processed through a card association network in a manner similar to a credit card transaction. In order to enable customers to use the header account to make payments in places where electronic payment via the connected device is not possible, a companion token bearing the header account identifier, such as a dual function EMV (i.e., compliant with the global standard for payment cards) chip card with a magnetic stripe may be distributed at the time of sale and provisioning of the connected device. Transaction information, such as debits, credits, merchant information, and the like, may be posted by the financial institution to the header account.

In the customer identification aspect of embodiments of the invention, at the time a customer acquires a device, such as a mobile phone, before activating the inactive header account, information about the customer may be collected from the customer. Such information may be sent to the financial institution with a request to verify that activation of the header account for the customer is compliant with predefined customer identification rules.

The device may have, for example, a default password that allows the customer to set a new secure password. If it is determined that activation of the header account for the customer is compliant with pre-defined customer identification rules a verification message may be sent to the customer's device. Such a determination may be based, for example, upon a confirmation that the customer has already been evaluated by an existing banking regulation-compliant customer identification process. If not, a bank-grade customer identification compliance protocol procedure may be performed.

Vendors that supply mobile phone devices or SIM cards are typically obligated to obtain and store some basic information about the customer before the device is sold. Embodiments of the invention specify a process that is administered as part of the vendor sales process. When a customer purchases a new mobile phone, adds a SIM card, or adds top-up minutes, several data elements are typically collected. Embodiments of the invention modify the vendors' data collection protocols to ask the customer if the customer wishes to have the customer's new connected device enabled to make payments. If the customer agrees, certain additional data points may be collected and the completed application may be entered electronically or scanned to the financial institution's adjudication center. The financial institution's compliance utility may provide a real-time or near-real-time answer/certification as to whether the customer has passed all bank regulation-required reviews.

An object of the customer identification process is, for example, first to determine that the person who is acquiring the device in which the arbitrary, secure element (i.e., the unique, arbitrary inactive header account identifier) is installed is permitted to engage with the banking system. That is known as a "sanctions list" check. If the customer passes the sanctions list check, additional information about the customer collected, for example, by the vendor of the device is subjected to checking by various mechanisms as required by customer identification banking requirements. Once those checks are performed, assuming that the customer is approved, a verification message may be sent to the vendor or to the mobile device itself. The customer identification verification may be performed electronically via a technology-based algorithmic process in real time or near-real time. In the process, a processor via an algorithm may retrieve additional information about the customer from other sources.

In an activation aspect of embodiments of the invention, once the customer identification process is successfully performed, the embedded header account identifier, such as the PAN number that is incorporated into the secure element chip-set at the time that the chip is manufactured or the connected device is assembled, may be activated. An activation message may be sent to the financial institution from the customer's device that includes, for example, the header account identifier and the customer's designation of a source account. A corresponding device-specific header account identifier may be maintained by the financial institution. The header account may carry a financial institution-sponsored BIN or other identifier unique to the financial institution. As previously noted, it is to be understood that the customer's use of the header account in transactions contemplates that the financial institution will play the role of merchant of record. A financial institution's card association BIN, such as the financial institution's VISA® or MASTERCARD® BIN, may be used for this purpose.

If the customer passes the customer identification process, the header account may be activated for the customer. The customer may then be allowed to make purchases and payments through the customer's mobile device-embedded header account by providing funding through a digital wallet. Activation of the header account may involve activating dormant code on the customer's device and translating the dormant code in a secure element of the device into a unique 14 or 16 digit PAN number. Activation of the dormant code may involve, for example, entry by the vendor of an unlock code on the mobile device to activate a payment functionality of the device.

Embodiments of the invention involve, for example, linking the activated header account to a digital wallet. The digital wallet is funded with the customer-designated source account that the customer will use to fund purchases and payments made through the customer's connected device. The customer may fund the customer's digital wallet with multiple funding sources. For example, the customer may use funding sources, such as a telephone company/carrier or device manufacturer funded rebate, a credit card, a debit card, an ACH transaction, other pre-paid accounts, rewards and loyalty programs, bill-to-carrier, peer-to-peer, and cash top-ups. Cash may be loaded through a cash top-up physical network specified by the financial institution, such as a telephone company/carrier store, as well as other institutions, such as WESTERN UNION®, TRAVELEX®, or the like. The digital wallet for embodiments of the invention incorporates business intelligence to manage the funding. For example, a payment may be set to be funded from a prepaid balance or an ACH transaction or a linked credit card, depending on factors, such as dollar amount or type of goods.

The customer may then make purchases and payments through the mobile device embedded header account by providing funding through the digital wallet. Once the header account is activated, any rebate from the telephone company/carrier or from the device manufacturer may be loaded as a stored value balance in the digital wallet. While actual cash billing/settlement may occur via the different funding sources, the customer may be furnished an itemized purchase and payment statement as an addendum to the customer's telephone company/carrier monthly statement. Such itemized purchase and payment statements may be provided on-line.

It is to be understood that the header account identifier, such as the unique PAN number, is the number that a merchant may see in a customer's transaction with the customer's mobile device. The merchant may see this number as the result of translation by a secure financial institution server to convert an arbitrary identifier installed in the chipset of the customer's device to an executable payment number. Within that same mechanism, the financial institution is able to identify a source of funds for the customer's transaction with the merchant. Such identification is accomplished via the linking of the customer's activated header account with the digital wallet which is funded by one or more of the customer's accounts, such as the customer's credit card account, debit card account, ACH transfer, or retailer reward or loyalty points. The customer's digital wallet may also comprise a user interface for management of the customer's funding sources and/or a user interface to manage access to the unique header account identifier in the secure element of the customer's mobile device that may be translated to the unique header account number.

A customer may use the customer's mobile device with the activated header account for embodiments of the invention in a purchase transaction in a merchant's "bricks-and-mortar" store or in an e-commerce transaction at a merchant's website using a computer with a web browser. To perform a transaction with the device, the customer may enter the customer's secret PIN code on the device. In response to entry of the customer's secret PIN code, software running on the operating system of the device may retrieve the unique header account identifier for the customer to use in the transaction. Thus, when the customer is ready to pay a retailer or check out on a retailer's website, the customer may enter the customer's PIN on the customer's device to authenticate the customer. The customer's unique header account identifier may be retrieved from the token installed in the secure element on the customer's device and displayed for the customer to give to a bricks-and-mortar retailer or to enter on an on-line retailer's website check-out screen.

Alternatively, the token may be communicated electronically, for example, via short message service (SMS) message to the financial institution's header account processor. At the header account processor, the token may be translated into a header account number, such as a 14 or 16 digit PAN number with the financial institution's BIN, which the merchant can accept and process through a card association network for payment. It is to be understood that instead of using a PIN to authenticate the customer, another authentication method, such as a biometric may be used to authenticate the customer. The customer's access to use the header account to make purchases may be governed by a dual factor authentication model enabled, for example, through PIN, password, and/or biometric authentication. It is to be further understood that in communicating the token electronically to the header account processor, software running on the customer's device may provide, for example, a one-time password for the customer to furnish the merchant. The merchant may, in turn, send the one-time password to the financial institution's header account processor. The header account processor may translate the one-time password into the header account number for use in the transaction with the merchant.

Figure 3:
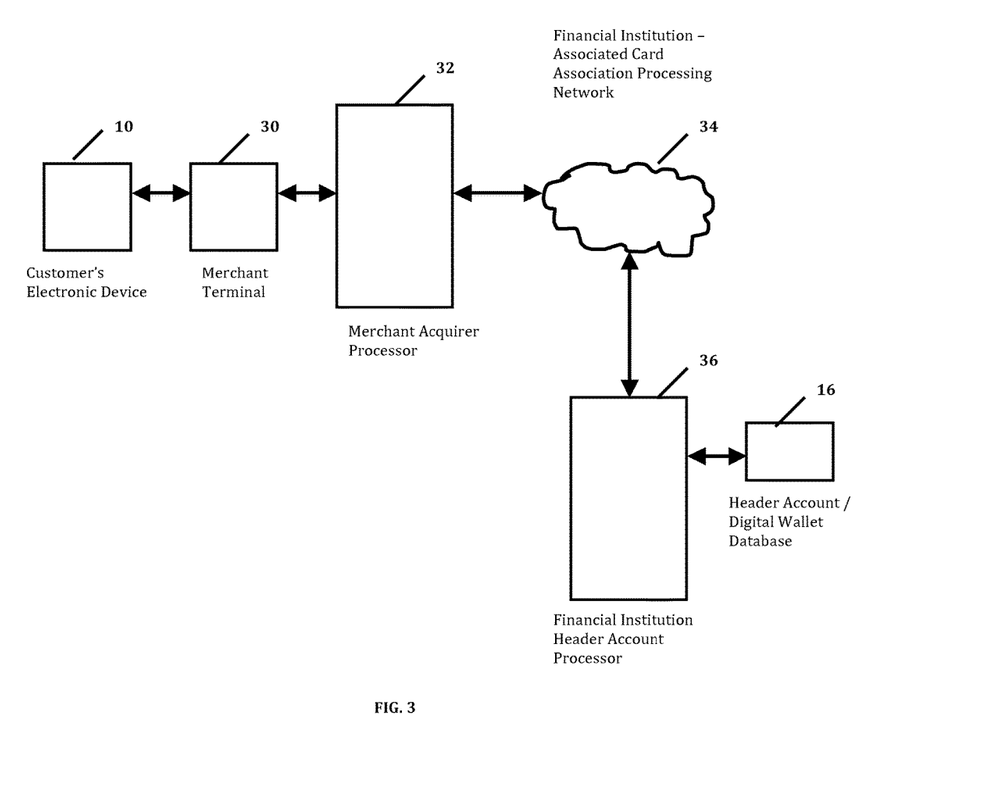
FIG. 3 is a schematic diagram that illustrates an example of key components and the flow of information between the key components in processing an "on-us" transaction using the header account for embodiments of the invention.

Processing of customer transactions using the customer's unique header account identifier in "on-us" transactions that have as a source account, for example, a credit card account issued by the financial institution may be slightly different from processing "off-us" transactions using the header account that have as a source account, for example, a credit card account issued by an another entity. FIG. 3 is a schematic diagram that illustrates an example of key components and the flow of information between the key components in processing an "on-us" transaction using the header account for embodiments of the invention.

Referring to FIG. 3, key components of the "on-us" transaction may include, for example, the customer's device 10, a merchant's terminal 30 communicating via a communication link with a merchant acquirer processor 32. A merchant acquirer is an entity that contracts with the merchant to allow the merchant to accept credit and/or debit cards and deposits funds from credit sales into the merchant's account. The merchant acquirer processor 32 may, in turn, be communicating via a card association processing network 34 with the financial institution header account processor 36. The header account processor 36 may be coupled to the database 16 storing digital wallet data and source account data.

Figure 4:
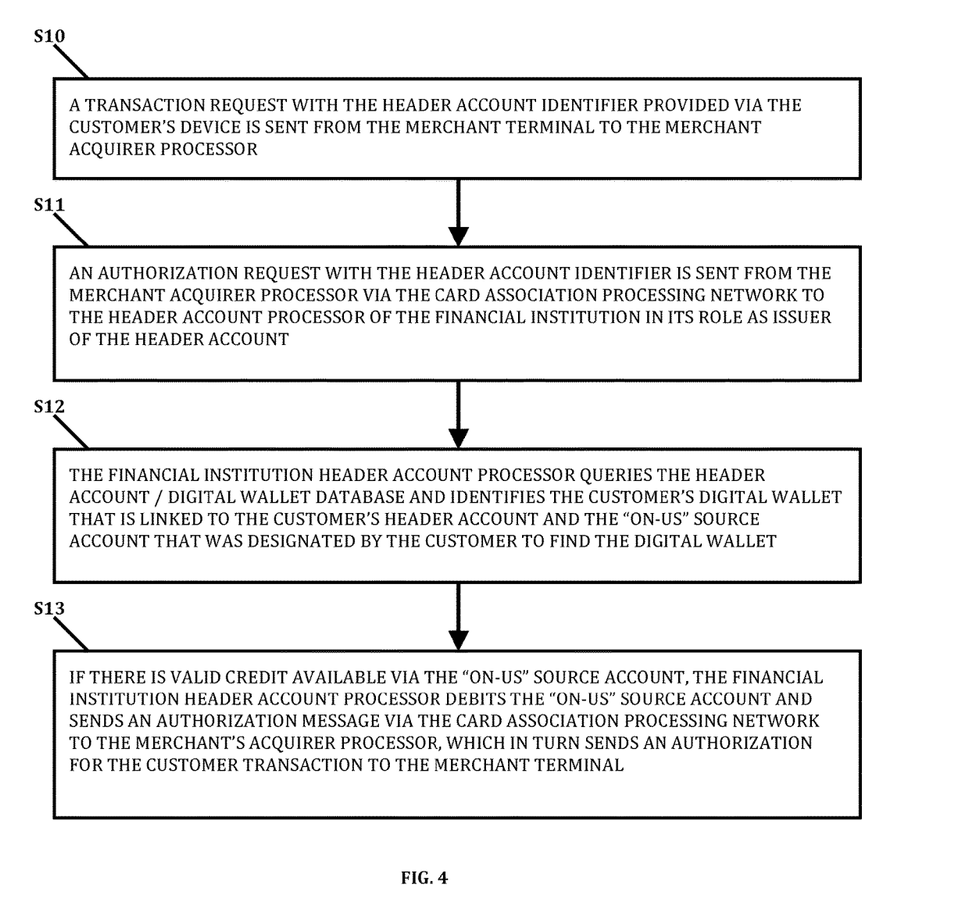
FIG. 4 is a flow chart that illustrates an example of the process flow in an "on-us" transaction using the header account for embodiments of the invention.

FIG. 4 is a flow chart that illustrates an example of the process flow in an "on-us" transaction using the header account for embodiments of the invention. Referring to FIGS. 3 and 4, at S10, a transaction request with the header account identifier provided via the customer's device 10 is sent from the merchant terminal 30 to the merchant acquirer processor 32. At S11, an authorization request with the header account identifier is sent from the merchant acquirer processor 32, via the card association processing network 34, to the header account processor 36 of the financial institution in its role as issuer of the header account. The particular card association network via which transactions with the header account are processed depends, for example, on which card association the financial institution may have contracted with for use of the card association's processing network for that purpose.

Referring further to FIGS. 3 and 4, at S12, the financial institution header account processor 36 queries the header account/digital wallet database 16 and identifies the customer's digital wallet that is linked to the customer's header account and the "on-us" source account that was designated by the customer to fund the digital wallet. At S13, if there is valid credit available via the "on-us" source account, the financial institution header account processor 36 debits the "on-us" source account and sends an authorization message via the card association processing network 34 to the merchant's acquirer processor 32, which may, in turn, send an authorization for the customer transaction to the merchant terminal 30. The financial institution may assume a dual role as both an issuer and a merchant in such "on-us" transactions. A "closed loop" system may be included for "on-us" processing, at which point the financial institution may choose to directly acquire merchants. A closed loop system refers to an internal, private payment transaction network of a financial institution.

Figure 5:
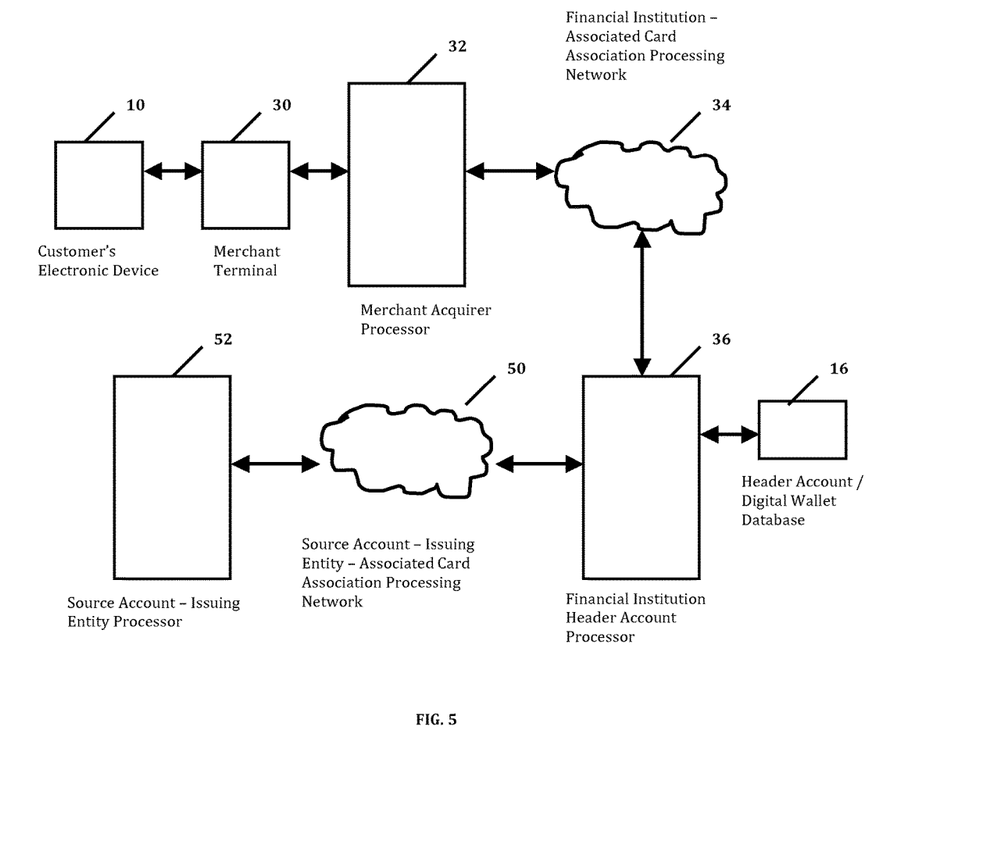
FIG. 5 is a schematic diagram that illustrates an example of key components and the flow of information between the key components in processing an "off-us" transaction using a header account that has as a source account, for example, a card account issued by an entity other than the financial institution.

FIG. 5 is a schematic diagram that illustrates an example of key components and the flow of information between the key components in processing an "off-us" transaction using a header account that has as a source account, for example, a card account issued by an entity other than the financial institution. Referring to FIG. 5, key components of an "off-us" transaction may include, for example, the customer's device 10, the merchant's terminal 30 communicating via the communication link with the merchant acquirer processor 32. The merchant acquirer processor 32 may, in turn, communicate via the card association processing network 34 with the financial institution header account processor 36. The header account processor 36 may be coupled to the database 16 storing digital wallet data and header account data.

As noted with reference to FIG. 3, the particular card association network 34 via which transactions with the header account are processed depends, for example, on which card association the financial institution may have contracted with for that purpose. In "off-us" transactions, the card association processing network via which transactions with "off-us" source account are processed may be the same card association network 34. However, the source account-issuing entity may have an association with a different card association processing network 50. In that case, the financial institution header account processor 36 may communicate via the card association processing network 50 with a card-issuing entity processor 52.

Figure 6:
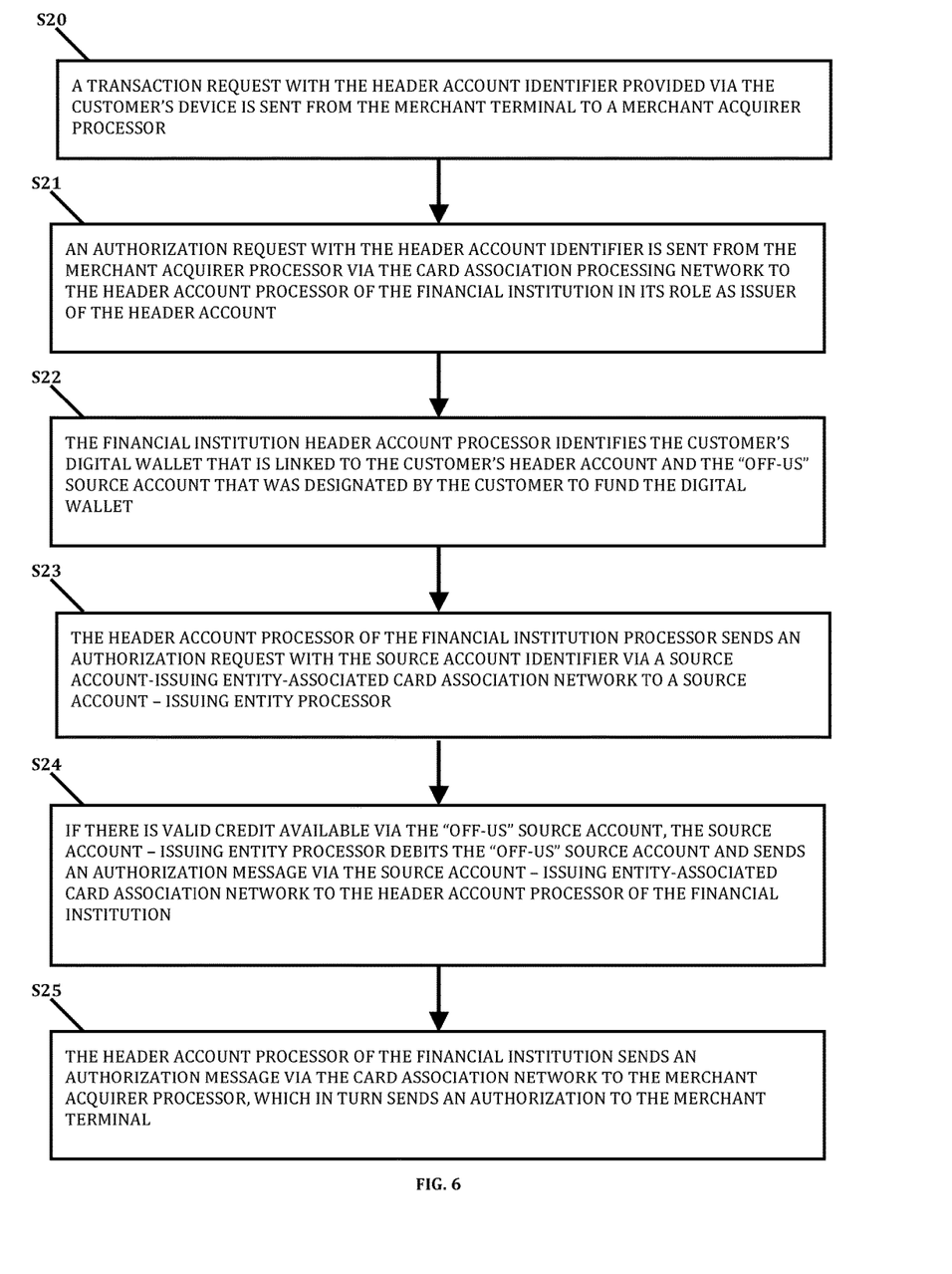
FIG. 6 is a flow chart that illustrates an example of the process flow for an "off-us" transaction using the header account for embodiments of the invention.

FIG. 6 is a flow chart that illustrates an example of the process flow for an "off-us" transaction using the header account for embodiments of the invention. Referring to FIGS. 5 and 6, at S20, a transaction request with the header account identifier provided via the customer's device 10 is sent from the merchant terminal 30 to a merchant acquirer processor 32. At S21, an authorization request with the header account identifier is sent from the merchant acquirer processor 32 via the card association processing network 34 to the header account processor 36 of the financial institution in its role as issuer of the header account. At S22, the financial institution header account processor 36 identifies the customer's digital wallet that is linked to the customer's header account and the "off-us" source account that was designated by the customer to fund the digital wallet.

Referring further to FIGS. 5 and 6, at S23, the header account processor 36 of the financial institution sends an authorization request with the source account identifier via a source account-issuing entity-associated card association network 50 to a source account-issuing entity processor 52. As noted, the particular card association network via which the authorization request is sent to the issuer of the source account depends, for example, on the branded card program under which the source account was issued. At S24, if there is valid credit available via the "off-us" source account, the source account-issuing entity processor 52 debits the "off-us" source account and sends an authorization message via the source account-issuing entity-associated card association network 50 to the header account processor 36 of the financial institution. At S25, the header account processor 36 of the financial institution sends an authorization message via the card association network 34 to the merchant acquirer processor 32, which may, in turn, send an authorization to the merchant terminal 10. The financial institution may likewise assume a dual role as both an issuer and a merchant in such "off-us" transactions.

It is to be understood that reference to the card association processing network means, for example the network of a card association, such as the VISA® card association network that processes VISA® card transaction or the MASTERCARD® card association that processes MASTERCARD® card transactions. Thus, in FIG. 6, at S23, if the source account is a VISA® card account, the authorization request is sent via the VISA® card association network to the source account-issuing entity processor 52. Likewise, if the source account is a MASTERCARD® card account, the authorization request is sent via the MASTERCARD® card association network to the source account-issuing entity processor 52.

An aspect of embodiments of the invention may involve, for example, monitoring the header account for money laundering activity and fraud by the financial institution's transaction monitoring service as long as the account remains active.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that my be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

What is claimed is:

1. A method for activating an electronic payments infrastructure, comprising:
providing, for a customer's electronic communication device, a unique identifier comprising latent computer code stored in memory of a secure element of the customer's electronic communication device at manufacture time assigned to an inactive header account, the unique identifier being processable via a transaction processing network;
receiving, using an interface processor, a request to verify that activation of the header account for the customer is compliant with predefined customer identification rules consisting at least in part of anti-money-laundering regulations defined by regulatory authorities, the request consisting at least in part of customer information;
determining, using a customer identification processor, that activation of the header account for the customer is compliant with predefined customer identification rules consisting at least in part of anti-money-laundering regulations defined by regulatory authorities and sending, using the interface processor, an activation message to the customer's device when said determination is made;
linking, using the interface processor, the header account to a digital wallet on a database; and
receiving, using the interface processor, the customer's designation of a source account for the digital wallet on the database.

2. The method of claim 1, wherein the customer's electronic device further comprises a mobile telephone.

3. The method of claim 1, wherein the unique header account identifier further comprises latent computer code stored in memory of the secure element of a chipset provided on the customer's electronic device at manufacture time.

4. The method of claim 1, wherein the unique header account identifier further comprises a primary account number by which merchants can process payments.

5. The method of claim 4, wherein the primary account number further comprises a bank identification number.

6. The method of claim 1, wherein the unique identifier is processable via the transaction processing network with a financial institution playing a merchant role in the processing network.

7. The method of claim 1, wherein the unique identifier is assigned to the header account on the database.

8. The method of claim 1, wherein the unique identifier is processable via a card association transaction processing network.

9. The method of claim 1, wherein receiving the request to verify further comprises receiving the request by the customer identification processor.

10. The method of claim 1, wherein sending the activation message further comprises sending the activation message to the customer's device by the customer identification processor.

11. The method of claim 1, wherein sending the activation message to the customer's device further comprises activating the unique identifier stored on the secure element on the customer's device at manufacture time.

12. The method of claim 1, wherein receiving the customer's designation of a source account further comprises receiving an activation response message from the customer's device consisting at least in part of the unique header account identifier and the customer's designation of the source account.

13. The method of claim 1, wherein receiving the customer's designation of the source account further comprises receiving the customer's designation of a credit card account as the source account.

14. The method of claim 1, further comprising:
receiving, via a transaction processing network, an authorizatiuon request with the header account identifier from a merchant acquire processor by a header account processor;
identifying and debiting, using the header account processor, an on-us source account designated by the customer to fund the digital wallet to which the header account is linked on the database; and
sending, via the transaction processing network, an authorization message to the merchant acquirer processor by the header account processor.

15. The method of claim 1, further comprising:
receiving, via a transaction processing network with which an issuer of the header account has an association, an authorization request with the header account identifier from a merchant acquirer processor by a header account processor;
identifying, using the header account processor, an off-us source account designate by the customer to fund the digital wallet to which the off-us source account is linked on the database;
sending, via a transaction processing network with which an issuer of the off-us source account has an association, an authorization request with the off-us source account identifier to an account processor of the off-us account issuer by the header account processor;
receiving, via the transaction processing network with which the issuer of the off-us source account has an association, an authorization message from the account processor of the off-us account issuer by the header account processor; and
sending, via the transaction processing network with which the issuer of the header account has an association, an authorization message to the merchant acquirer processor by the header account processor.

16. A system for activating an electronic payments infrastructure, comprising:
a secure element for a customer's electronic communication device, the secure element storing latent computer code at manufacture time comprising a unique identifier assigned to an inactive header account, and the unique identifier being processable via a transaction processing network;
an interface processor coupled to memory and being programmed for receiving a request to verify that activation of the header account for the customer is compliant with predefined customer identification rules consisting at least in part of anti-money-laundering regulations defined by regulatory authorities, the request consisting at least in part of customer information;
a customer identification processor coupled to memory and being programmed for determining that activation of the header account for the customer is compliant with the predefined customer identification rules consisting at least in part of anti-money-laundering regulations defined by regulatory authorities; and
the interface processor being further programmed for sending an activation message to the customer's device when said determination is made, linking the header account to a digital wallet on a database, and receiving the customer's designation of a source account for the digital wallet on the database.

17. A non-transitory computer-readable storage medium with an executable program stored thereon for activating an electronic payments infrastructure, wherein the program instructs an interface processor to:
receive a request, consisting at least in part of customer information, to verify that activation of a header account for the customer is compliant with predefined customer identification rules consisting at least in part of anti-money-laundering regulations defined by regulatory authorities, the header account having a unique identifier processable via a transaction network, and the header account identifier comprising latent computer code stored in memory of a secure element of the customer's electronic communication device of the customer at manufacture time;
receive a determination of a customer identification processor that activation of the header account for the customer is compliant with the predefined customer identification rules consisting at least in part of anti-money-laundering regulations defined by regulatory authorities;
send an activation message to the customer's device when said determination is received;
link the header account to a digital wallet on a database; and
receive the customer's designation of a source account for the digital wallet on the database.

18. A method of verifying that a header account linked to a digital wallet on database, and linked to a customer electronic communication device having a unique identifier comprising latent computer code stored in memory of a secure element of the customer's electronic communication device at manufacture time, is compliant with customer identification rules, comprising:
receiving, using an interface processor, a request to verify that the header account for the customer is compliant with predefined customer identification rules consisting at least in part of anti-money-laundering regulations defined by regulatory authorities, the request consisting at least in part of customer information;
determining, using a customer identification processor, that the header account for the customer is compliant with the predefined customer identification rules consisting at least in part of anti-money-laundering regulations defined by regulatory authorities and sending an activation message to the customer's device when said determination is made.

* * * * *